United States Patent Office.

JUAN YSIDRO DIAZ, OF HAVANA, ISLAND OF CUBA.

Letters Patent No. 100,871, dated March 15, 1870.

IMPROVEMENT IN THE MANUFACTURE OF FERTILIZERS.

The Schedule referred to in these Letters Patent and making part of the same.

*To all whom it may concern:*

Be it known that I, JUAN YSIDRO DIAZ, of Havana, in the Island of Cuba, have invented a new and useful Universal Fertilizer, and process for manufacturing the same; and I do hereby declare that the following specification is a true and exact description thereof.

My invention consists in disintegrating and concentrating into a convenient form the fertilizing properties, well known to largely exist in all kinds of such refuse as is common in cities, including every kind of so-called waste matter, whether it be spent matter from the manufactories, the common flowage of sewers, the contents of privy-vaults, ashes, cinders, sweepings of streets and stables, slaughter-house refuse, carcasses of animals, or kitchen refuse, all of which may or may not be combined in the production of the desired result.

The process of disintegrating and concentrating is described as follows:

A series of three tanks or sets of tanks or reservoirs are requisite. One somewhat elevated, another next below and in front of that, and a third upon the surface of the ground.

The fluids being separated from the solids of the matter in hand, as well as may be, are placed in the first or upper tank. To these fluids I add an equal quantity of sea-water, when it is attainable; in other localities, practically similar solutions artificially prepared should be used.

The solids are then thrown in the second tank in layers. Such as are most solid should be mixed with a quantity of quicklime, in proportions of, say, one twenty-fifth of the bulk, and the whole placed between those solids more easily disintegrated.

As a top layer, pulverized charcoal is used, for the purpose of retaining, in a great degree, such valuable gases as would otherwise escape.

In the bottom of the front of the upper tank are openings, capable of being graduated or stopped entirely, through which the fluids are permitted to flow into the top of the second tank, thus moistening its contents.

After being thus moistened the mass is permitted to ferment, care being taken that it does not pass the point in which the matter divides into small particles, soluble to a considerable degree in water, and also into gaseous emanations to a greater extent than can be readily absorbed by the charcoal.

Broad, shallow, open evaporating-vats are placed in front of and below the disintegrating-tank, and passages provided with wire filters open from the tank to the vats, through which, at intervals, flowage of the liquids charged with disintegrated particles of the solid matter is conducted.

When these shallow tanks are thus filled the flow is cut off, and by evaporation of the same the water passes off, leaving a fine residuum in the bottom of the tanks, constituting the product, which is a part of my invention.

In cold countries, during the winter, the freezing of the fluids of the evaporating-vats will, if the ice be removed, serve a purpose similar to the evaporation of the sun during the summer. The vats should be provided with adjustable roofs or covers to protect them from the rain.

When the fermenting-vats shall cease to yield the disintegrated matter in semi-solution, the tanks should be cleared and the operation repeated. Such vegetable matter as might still remain should be dried and calcined, and the ashes added to the disintegrated products. Bones should be ground and also added thereto.

If, during the process of evaporation, it is found that the gaseous vapors are escaping too freely, I recommend that such antiseptics as sulphate of iron or hydrochloric acid be thrown in suitable quantities into the vats.

In locations where economy therein may be properly observed, small quantities of sulphate of iron, sulphate of lime, or chloride of manganese may be used to great advantage in serving to retain volatile and valuable gases.

Having thus described my invention,

I claim as new and desire to secure by Letters Patent of the United States—

1. The process, substantially as herein described, which consists in treating with sea-water, or equivalent solution, all kinds of refuse matter containing fertilizing properties, and in the fermentation, disintegration, and concentration of the same, for the purposes specified.

2. As a new article of manufacture, the improved Universal Fertilizer, resulting from the process herein described.

JUAN YSIDRO DIAZ.

Witnesses:
JNO. SMITHEY,
SALVADOR G. GOMEZ